Jan. 7, 1941. H. A. WINKELMANN ET AL 2,227,991
COMPOSITE PRODUCTS COMPRISING POLYMERIZED CHLOROPRENE
Filed Feb. 10, 1939

Inventors:
Hebert A. Winkelmann
Eugene W. Moffett
By Zabel, Carlson, Fitzbaugh & Wells
Attorneys.

Patented Jan. 7, 1941

2,227,991

UNITED STATES PATENT OFFICE 2,227,991

COMPOSITE PRODUCTS COMPRISING POLYMERIZED CHLOROPRENE

Herbert A. Winkelmann, Chicago, Ill., and Eugene W. Moffett, Milwaukee, Wis., assignors to Marbon Corporation, Gary, Ind., a corporation of Delaware Application February 10, 1939, Serial No. 255,724

8 Claims. (Cl. 154—43)

This application is a continuation in part of our copending application Serial No. 55,684, filed December 21, 1935, now Patent No. 2,147,620, dated February 14, 1939, in which there is disclosed but not claimed compositions and processes for uniting rubber-like polymerized chloroprene to various other materials, including metals.

The invention relates to composite products. More particularly it relates to the adhesion of rubber-like polymerized chloroprene to other materials, such as metals.

Various methods of obtaining a more or less permanent adhesion of rubber to metal are known. Generally these methods have been based on the use of an intermediate bonding material, such as the thermoprenes, between the rubber and the metal. However, these bonding materials have not been entirely satisfactory for uniting rubber-like polymerized chloroprene. Some of the bonding materials give mediocre adhesion, others give satisfactory adhesion at room temperature but fail at elevated temperatures, and many of the bonding materials are expensive or not readily available.

It is, therefore, an object of this invention to produce a composite product in which rubber-like polymerized chloroprene and metals are firmly united, and to provide an inexpensive and readily performed process for manufacturing the product. Other objects will become apparent from the following description of the invention and from the accompanying drawing, wherein.

Figure 1:
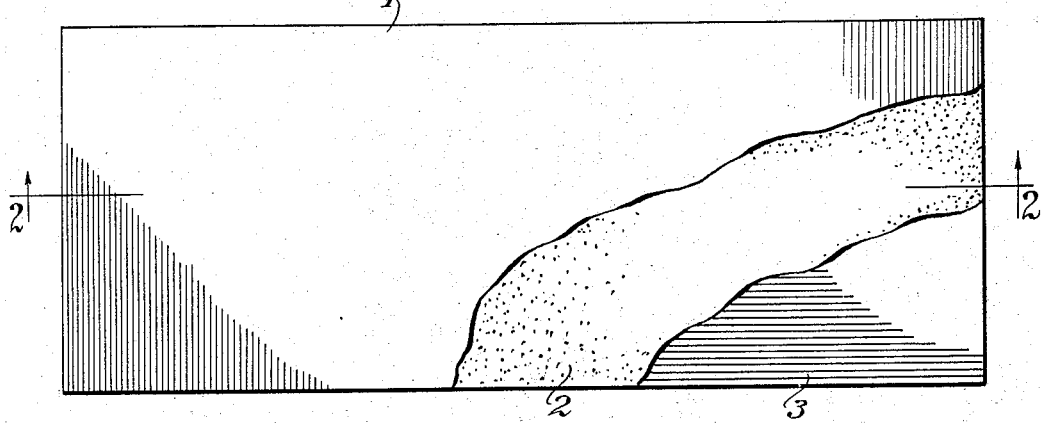
Fig. 1 is a plan view of a composite product which embodies this invention in which a portion of the composite product is cut away to show the underlying layers.
Figure 2:
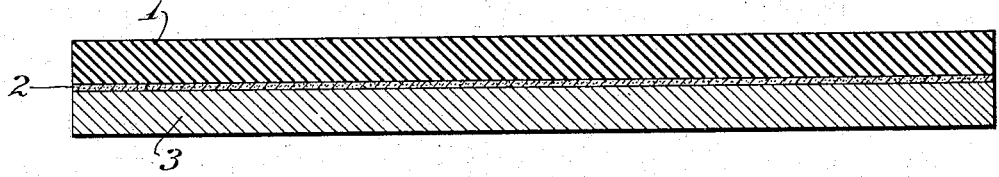
Fig. 2 is a section along lines 2—2 of Fig. 1.

The invention comprises broadly the adhering of Neoprene or other resilient rubber-like polymerized chloroprene, as shown by reference character 1, to a material 3 such as metal, by interposing between the Neoprene or like substance 1 and the metal 3 a bonding material 2, including a halogen containing rubber derivative.

The composition of the bonding material may vary widely from the straight unmodified halogen containing rubber derivative, preferably a rubber hydrohalide, to a composition in which the halogen containing rubber derivative is in a large although not predominant proportion. The rubber hydrohalides may be crystalline, amorphous, soluble type or insoluble type, saturated, partially saturated or partially thermally decomposed. Likewise, the rubber halides may be saturated or partially saturated.

The adhesion of Neoprene to metal which is superior to that obtained by vulcanizing Neoprene in direct contact with metal is obtained by applying straight unmodified rubber hydrochloride in solution or solid form to the metal, superimposing a layer of vulcanizable Neoprene containing sulfur and accelerator over the rubber hydrochloride, and subjecting the composite product to heat and pressure sufficient to vulcanize the Neoprene.

A better adhesion of Neoprene to metal, however, is obtained by the use of the following compositions:

TABLE I

*Exemplary preferred composition*

| | Best | Variations |
|---|---|---|
| Rubber hydrochloride (30% chlorine content) | 100 | 100 |
| Vulcanizing agent: Sulfur | 50 | 20–80 |
| Accelerator: Butyraldehyde-aniline | 3 | 2–10 |
| Plasticizer: Dibutyl phthalate | 75 | 25–100 |
| Heat stabilizer: | | |
| Magnesium oxide (MgO) | 10 | 0–20 |
| Lead oxide (PbO) | 10 | 0–20 |

It should be understood, however, that the above formulae are but illustrations of preferred embodiments of this invention.

In general, any vulcanizable Neoprene or other rubber-like polyhaloprene material may be bonded to metal by halogen containing rubber derivatives. It is also possible to use a prevulcanized Neoprene. Suitable compounded Neoprene mixes which may be bonded to metal by the composition of Table I are:

| | A | B |
|---|---|---|
| Neoprene | 100 | 100 |
| Light magnesium oxide | 10 | 10 |
| Agerite powder | 2.5 | 2.5 |
| Zinc oxide | 10 | 10 |
| Soft carbon black | 30 | 30 |
| Cottonseed oil | 7 | 5 |
| Sulfur | | 1 |

Other vulcanizing agents than sulfur may be used. Selenium, of course, may be used in place of sulfur. The use of sulfur chloride applied to the rubber hydrochloride immediately before assembling the Neoprene and metal together results in a cold vulcanization of the rubber hydrochloride, and to some extent of the adjoining Neoprene.

Other accelerators for the vulcanization of rubber hydrochloride than butyraldehyde-aniline may be used. Piperidinium penta-methylene dithio-carbamate gives good results. The use of an accelerator is not absolutely essential.

The choice of a proper plasticizer is important. The plasticizer, however, is not essential even in the preferred composition, but many plasticizers greatly improve the adhesiveness of the rubber hydrohalide to the metal and to the Neoprene. However, there are some materials which are splendid softeners or plasticizers for rubber hydrohalide which give negative results or are actually detrimental to adhesion, particularly to the adhesion of the rubber hydrohalide to the rubber. Dibutyl phthalate has an effect on the rubber hydrochloride, which results in a superior bond of the rubber hydrochloride to the Neoprene. Other materials which may be used satisfactorily in place of dibutyl phthalate, although not with such good results, are butyl stearate, butyl oleate, butyl ricinoleate, ester gum, maleic anhydride and drying oils.

The use of heat stabilizers such as magnesium oxide, magnesium carbonate and lead oxide is useful in the heat treatment and in the mixing of the ingredients when the mixture is made by milling.

Milling of the sulfur and other solids into the rubber hydrochloride results in a better dispersion and appears to give a composition of better bonding power. Furthermore, the milled mixture dissolves more readily in benzol or other solvents, forming a cement which is less viscous than the unmilled products. A cement or liquid coating composition comprising an intimate dispersion of the materials of Table I in benzol or like volatile solvent to form an approximately 20% solution is particularly adaptable for coating the metal and Neoprene.

The article which is to be coated with Neoprene, for example a steel plate 3, is cleaned free of grease and scale, as for example by sand blasting. The article is then given a uniform coat of the cement described above. The coating may then be dried to obtain a film 2. However, as an alternative method a preformed sheet of the rubber hydrochloride composition without solvents may be superimposed on the metal. Such a preformed sheet may be obtained by milling and calendering the composition into a sheet. A layer of vulcanizable Neoprene 1 is then applied over the rubber hydrohalide and metal, and the composite structure is vulcanized under pressure in a heated mold or in a vlucanizer containing steam or hot water under pressure. The temperature and time of cure may vary within wide limits, and is necessarily more for some types of stock than others. A temperature of 300° F. and a time of 30–40 minutes have been found satisfactory for the compositions of Table I using the compounded Neoprene mixes A or B described above. At this temperature and time, for example, the Neoprene and rubber hydrohalide both become cured or vulcanized, and both become relatively non-thermoplastic. The vulcanization of the rubber hydrohalide improves its adhesive properties, particularly at elevated temperatures. Thus it becomes possible to remove the composite vulcanized product from a hot mold with consequent saving of time and expense. The vulcanized rubber hpdrochloride bond is resistant to solvents, lubricating oils and the like, as is also the Neoprene.

Neoprene adhered to metal by the process described above can be bonded to the metal so that it cannot be torn loose, the strength of the adhesive bond exceeding the strength of the Neoprene. The proportions in the formulae given above, however, in many cases must be modified to obtain this result with all types of Neoprene stock. With the compounded Neoprene described above bonded with the above described best preferred formula of Table I to a steel plate, a pull of 320 lbs. per square inch resulted in the Neoprene tearing or splitting, while the rubber hydrochloride composition remained firmly adhering to the metal and to the adjoining Neoprene.

Although the invention has been described as carried out with an unvulcanized Neoprene it may be carried out with advantages with prevulcanized Neoprene. A composite product of metal, rubber hydrochloride containing sulfur and accelerator, and vulcanized Neoprene can be bonded together by vulcanization in a shorter time than required for the curing of composite product comprising unvulcanized Neoprene. The composite structure may be bonded together by pressure. It is advisable, however, to subject the structure to heat sufficient to at least thermoplasticize the rubber hydrohalide, and preferably sufficient to cure or vulcanize the rubber hydrohalide.

The use of rubber hydrobromide in place of rubber hydrochloride is within the bounds of this invention. Halogenated rubber hydrohalides and rubber halides may be used to some extent but in many important respects they act entirely differently than the hydrohalides, as for example, in their instability, particularly under the influence of heat.

However, the rubber halides as operable and the rubber halide compositions containing sulfur act similarly to the rubber hydrohalide compositions. Rubber chloride, for example, may be substituted for rubber hydrochloride in the formulae of Table I, the composition interposed between Neoprene and metal and the assembly subjected to heat and pressure to cure as with the curing of the rubber hydrohalide compositions. It is believed that the rubber chloride containing sulfur and accelerator is also vulcanized although the action is apparently slower than with rubber hydrohalides. Whatever the action, the addition of sulfur to the rubber chloride improves the strength of the metal to Neoprene bond.

Although the invention has been described above with relation to the use of steel and rubber-like polymerized chloroprene, it is not intended to so limit it except as necessitated by the prior art. The process is operable to unite rubber-like materials such as polymerized chloroprene, polymethylene-polysulphide plastics, to other materials generally, including iron and steel, copper, brass, aluminum, porcelain, glass, wood, paper, etc.

Natural rubber may also be united strongly to the chloroprene rubber by the process of this invention, using the intermediate bonding composition of Table I with either rubber hydrochloride, chlorinated rubber or combinations thereof as the main constituents.

While there has been disclosed with considerable detail certain preferred manners of performing this invention, it is not intended or desired to be solely limited thereto, for as hitherto stated the procedure may be modified, the precise proportions of the materials utilized may be varied, and other materials having equivalent properties may be employed if desired without departing from the spirit and scope of the invention as defined in the appended claims.

We claim:

1. A composite product comprising a layer of rubber-like polymerized chloroprene, a layer of metal and an intermediate bonding layer of a composition comprising a halogen containing rubber derivative and a vulcanizing agent.

2. A composite product comprising a layer of rubber-like polymerized chloroprene, a layer of metal and an intermediate bonding layer of a composition comprising a halogen containing rubber derivative and sulfur.

3. A composite product comprising a layer of rubber-like polymerized chloroprene, a layer of metal and an intermediate bonding layer of a composition comprising a rubber hydrochloride and sulfur.

4. A composite product comprising a layer of rubber-like polymerized chloroprene, a layer of metal and an intermediate bonding layer comprising chlorinated rubber and sulfur.

5. A composite product comprising a layer of rubber-like polymerized chloroprene, a layer of metal and an intermediate bonding layer of a composition comprising a rubber hydrochloride, an organic vulcanizing accelerator, and sulfur.

6. A composite product comprising a layer of rubber-like polymerized chloroprene, a layer of metal and an intermediate bonding layer of a composition comprising chlorinated rubber, an organic vulcanizing accelerator, and sulfur.

7. A composite product comprising a layer of rubber-like polymerized chloroprene, a layer of metal and an intermediate bonding layer of a composition comprising a halogen containing rubber derivative, a plasticizer and sulfur.

8. A composite product comprising a layer of rubber-like polymerized chloroprene, a layer of metal and an intermediate bonding layer of a composition comprising a rubber hydrochloride, dibutyl phthalate and sulfur.

HERBERT A. WINKELMANN.
EUGENE W. MOFFETT.